M. L. SENDERLING.
Centrifugal Filtering-Machines.
No. 148,513. Patented March 10, 1874.
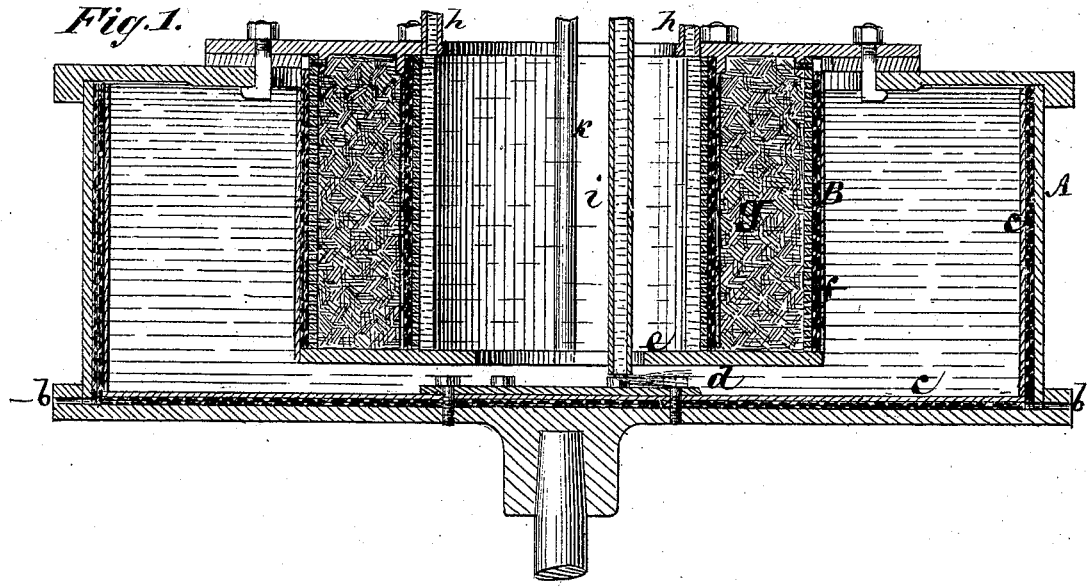
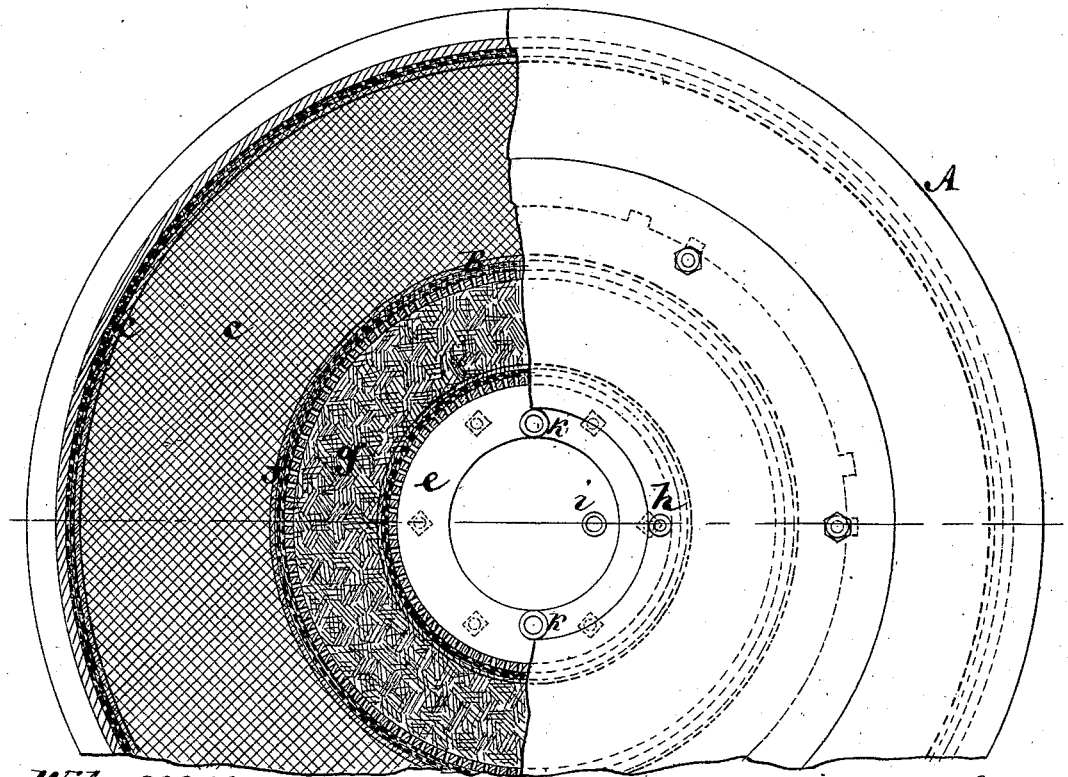
Witnesses
John Becker
Fred Haynes
M. L. Senderling
by his Attorneys
Brown & Allen

UNITED STATES PATENT OFFICE.

MARTIN L. SENDERLING, OF JERSEY CITY, NEW JERSEY.

IMPROVEMENT IN CENTRIFUGAL FILTERING-MACHINES.

Specification forming part of Letters Patent No. 148,513, dated March 10, 1874; application filed September 2, 1873.

*To all whom it may concern:*

Be it known that I, MARTIN L. SENDERLING, of Jersey City, in the county of Hudson and State of New Jersey, have invented an Improvement in Filters, of which the following is a specification:

This invention relates to rotary filters, and is applicable to filtering liquids of various kinds. It consists, generally, in a combination of an outer case and inner annular filter, connected by a passage below, and arranged to revolve in common, whereby on the liquid to be filtered being introduced down within or through the inner annular filter, it is projected by centrifugal action, through the lower connecting-passage, within and so as to fill the outer case, and, not finding any or sufficient vent therethrough, is forced back, or has a centripetal action given it through the sides or walls of the inner annular filter, from the interior of which the filtered liquid, lying or mounting concentrically within the inner surface thereof, is delivered, while the residue or unfiltered liquid and material is kept by the centrifugal action in the outer case, free from clogging the inner annular filter, and so that a clear escape is provided throughout the depth of the latter for the liquid in the course of its filtration. The invention also includes certain other peculiarities of construction, including a bottom filtering-surface of or to the revolving outer cylinder.

Figure 1 represents a vertical section of a rotary filter constructed in accordance with my invention, and Fig. 2 a partially sectional plan of the same.

Similar letters of reference indicate corresponding parts.

A represents an outer cylinder or case, which may have its sides perforated to a limited extent, if desired, but, so far as the general principle or action of the invention is concerned, may be regarded as close, and the only filtering perforations with which said outer cylinder is here represented as provided are apertures *b* along the upper surface of the bottom of said cylinder, leading to its periphery. These apertures provide for the escape of liquid passing along the bottom or down the sides of the outer case, after the same has been filtered or strained by percolating through lining strainers *c*, which may be composed of one, two, or more grades of wire-cloth and an inner bag, such arrangement serving to give a downward clearance or escape, either when the apparatus is standing or as it is revolving, when centrifugal force will aid in thus expelling a certain portion of the liquid. But the main filtering action of the apparatus is dependent upon an inner cylinder or annular filter, B, which is in close connection with the cylinder A at its top, but in open communication with it, by one or more passages, *d*, below, and which has a lower internally-projecting flange, *e*. This annular filter B may either be a simple reticulated cylinder covered with one or more layers of wire-cloth and a bag or other suitable covering, constituting a strainer, *f*, or it may be a body-filter of annular form, having its inner and outer walls suitably perforated, and containing between them a filling, *g*, of charcoal or other filtering material; but in all cases the flange *e* should project internally beyond the inner walls of said filter, also internally beyond an outlet or outlets, *h*, for the filtered liquid, in or through an upper internally-projecting flange of the filter.

The liquid to be filtered is introduced by one or more pipes, *i*, which may be arranged either to pass down through the flange *e* or through the inner open space circumscribed by said flange; or the liquid may be otherwise fed to enter the passage *d*, from whence it is passed by the centrifugal action of the machine into the outer case A, and caused to fill the latter; but, not finding any or sufficient vent for its expulsion therefrom by the centrifugal action of the machine, said liquid is forced back, or has a centripetal action given it through the annular filter B, and the filtered liquid caused to arrange itself as a lining, by the centrifugal action of the machine, within the central space of said filter and against the inner wall of the latter, the same forming a hollow column, mounted upon the flange *e*, and escaping by the outlets *h*, which should be bent outwardly to discharge by centrifugal action into any suitable receiver. While the filtered liquid is thus passing off through the central portion of the machine, the unfiltered portion and solid or other matter is retained within the outer case, from which it may readily be discharged in various ways, and where it is kept by the centrifugal action of the machine, when running, from fouling or clogging the filter B, or material therein, and so that the whole exterior surface of said filter B and its filtering-body or filling, if any, is free or equally exposed, to effect the required filtration.

In filtering cane-juice and certain other liquids, it will be advisable to insert one or more outlets or pipes, $k$, down through the flange $e$, in proximity to its inner edge, for the purpose of carrying off any scum or foam forming on the inner surface of the liquid in the passage $d$. These pipes may be either stationary or adjustable to insure their proper action.

What is here claimed, and desired to be secured by Letters Patent, is—

1. A rotary filter composed in part of an outer case, A, and inner annular filter B, connected by a lower passage, $d$, for rotation in common, as described, whereby the liquid which is thrown outward by centrifugal action is forced or delivered inward through the annular filter, substantially as specified.

2. The annular filter B, having an internally-projecting lower flange, $e$, and one or more upper outlets, $h$, arranged, in relation with said flange, as described, in combination with the outer case A and lower connecting-passage $d$, for operation together as specified.

3. The revolving cylinder or case A, provided with a bottom filtering-surface, $c$, in combination with the openings $b$, arranged in relation with said surface, and running outward to the periphery of the case, essentially as shown and described.

4. The combination of one or more foam-pipes or outlets, $k$, with the annular filter B, the flange $e$, the passage $d$, and the outer case A, substantially as specified.

MARTIN L. SENDERLING.

Witnesses:
MICHAEL RYAN,
FRED. HAYNES.